(12) United States Patent
Feygelman et al.

(10) Patent No.: US 9,624,040 B2
(45) Date of Patent: Apr. 18, 2017

(54) SUBSTRATE SUPPORT

(75) Inventors: Alexander Feygelman, Petach-Tiqwa (IL); Sharon Nagler, Gan Yavna (IL)

(73) Assignee: Hewlett-Packard Development Company, L.P., Houston, TX (US)

(*) Notice: Subject to any disclaimer, the term of this patent is extended or adjusted under 35 U.S.C. 154(b) by 384 days.

(21) Appl. No.: 13/700,805

(22) PCT Filed: Aug. 25, 2010

(86) PCT No.: PCT/US2010/046713
§ 371 (c)(1),
(2), (4) Date: Nov. 29, 2012

(87) PCT Pub. No.: WO2012/026934
PCT Pub. Date: Mar. 1, 2012

(65) Prior Publication Data
US 2013/0065742 A1    Mar. 14, 2013

(51) Int. Cl.
*B65G 39/00*  (2006.01)
*B65H 75/28*  (2006.01)
*B41M 5/00*   (2006.01)
*G03G 15/16*  (2006.01)

(52) U.S. Cl.
CPC ............... *B65G 39/00* (2013.01); *B41M 5/00* (2013.01); *B65H 75/28* (2013.01); *G03G 15/1655* (2013.01); *Y10T 29/49826* (2015.01); *Y10T 428/24273* (2015.01)

(58) Field of Classification Search
CPC .......... B41F 27/00; B41F 27/06; B41F 27/12; B41F 27/1206; B41F 27/1218; B41F 27/125; B41F 27/1262; B41F 30/04
USPC ....................... 101/415.1; 492/21, 45; 83/659
See application file for complete search history.

(56) References Cited

U.S. PATENT DOCUMENTS

| 2,878,095 A | * | 3/1959 | Hackenberg et al. ........ 346/138 |
| 2,963,969 A | * | 12/1960 | Sauberlich .......... B41F 27/1243 |
| | | | 101/415.1 |
| 2,973,710 A | * | 3/1961 | Hantscho .................... 101/415.1 |
| 2,990,772 A | * | 7/1961 | Fischetti ............. B41F 27/1262 |
| | | | 101/415.1 |
| 3,795,193 A | * | 3/1974 | Johne et al. ................ 101/415.1 |
| 3,903,795 A | * | 9/1975 | Suzuki .......................... 101/409 |
| 3,924,849 A | | 12/1975 | Murakami |
| 3,934,509 A | * | 1/1976 | Saunders ............. B41F 27/1262 |
| | | | 101/415.1 |
| 4,277,164 A | * | 7/1981 | Fortmann ..................... 399/165 |
| 4,345,906 A | | 8/1982 | Gregoire |

(Continued)

FOREIGN PATENT DOCUMENTS

| DE | 1174330 B | * | 7/1964 | .......... B41F 27/1262 |
| JP | 9136731 | | 5/1997 | |

(Continued)

OTHER PUBLICATIONS

International Searching Authority, International Search Report and Written Opinion, PCT/US2010/046713, 11 pages, Apr. 26, 2011.

*Primary Examiner* — Jacob Cigna
(74) *Attorney, Agent, or Firm* — Rathe Lindenbaum LLP

(57) ABSTRACT

A substrate support includes a drum, a first surface carried by the drum, and a second surface carried by the drum opposite and oblique to the first surface and a wedging member. The wedging member is sandwiched between the first surface and the second surface and is resiliently biased in a wedging direction.

13 Claims, 13 Drawing Sheets

(56) References Cited

U.S. PATENT DOCUMENTS

| | | | | |
|---|---|---|---|---|
| 4,426,931 | A | * | 1/1984 | Vogt .......................... 101/415.1 |
| 4,495,865 | A | * | 1/1985 | Kamoda ................... 101/415.1 |
| 4,643,093 | A | * | 2/1987 | Goar .................... B41F 27/125 |
| | | | | 101/401.1 |
| 4,707,902 | A | * | 11/1987 | Kunkel ................ B41F 27/125 |
| | | | | 29/407.09 |
| 5,010,818 | A | * | 4/1991 | Wallschlaeger, Sr. ..... 101/415.1 |
| 5,062,363 | A | * | 11/1991 | Reichel ..................... 101/415.1 |
| 5,295,436 | A | * | 3/1994 | Kittsteiner et al. ........ 101/415.1 |
| 5,396,842 | A | | 3/1995 | Quinci et al. |
| 5,408,297 | A | * | 4/1995 | Matsuo .................. G03F 3/102 |
| | | | | 101/415.1 |
| 5,485,784 | A | * | 1/1996 | Walschlaeger, Sr. ...... 101/415.1 |
| 5,735,211 | A | * | 4/1998 | Parks et al. ................. 101/415.1 |
| 6,827,019 | B1 | * | 12/2004 | Hieronymus ....... B41F 27/1231 |
| | | | | 101/383 |
| 7,007,580 | B2 | * | 3/2006 | Hilliard et al. ................. 83/346 |
| 7,100,502 | B2 | * | 9/2006 | Heller ................ B41F 27/1243 |
| | | | | 101/378 |
| 2006/0150845 | A1 | * | 7/2006 | Zahnd ................ B41F 27/1262 |
| | | | | 101/415.1 |
| 2007/0084371 | A1 | * | 4/2007 | Nagler et al. .............. 101/415.1 |

FOREIGN PATENT DOCUMENTS

| | | | |
|---|---|---|---|
| JP | 2000-264510 | A | 9/2000 |
| JP | 2001-130797 | A | 5/2001 |
| JP | 2001-301065 | A | 10/2001 |
| JP | 2004-256283 | A | 9/2004 |
| JP | 2006-515254 | A | 5/2006 |
| KR | 10-0622798 | B1 | 9/2006 |

\* cited by examiner

SUBSTRATE SUPPORT

BACKGROUND

In some devices, a substrate is supported and held against a drum. Existing mechanisms for holding the substrate against the drum may be unreliable, complex, space consuming or difficult to use, and may damage the substrate.

DETAILED DESCRIPTION OF THE EXAMPLE EMBODIMENTS

Figure 1:
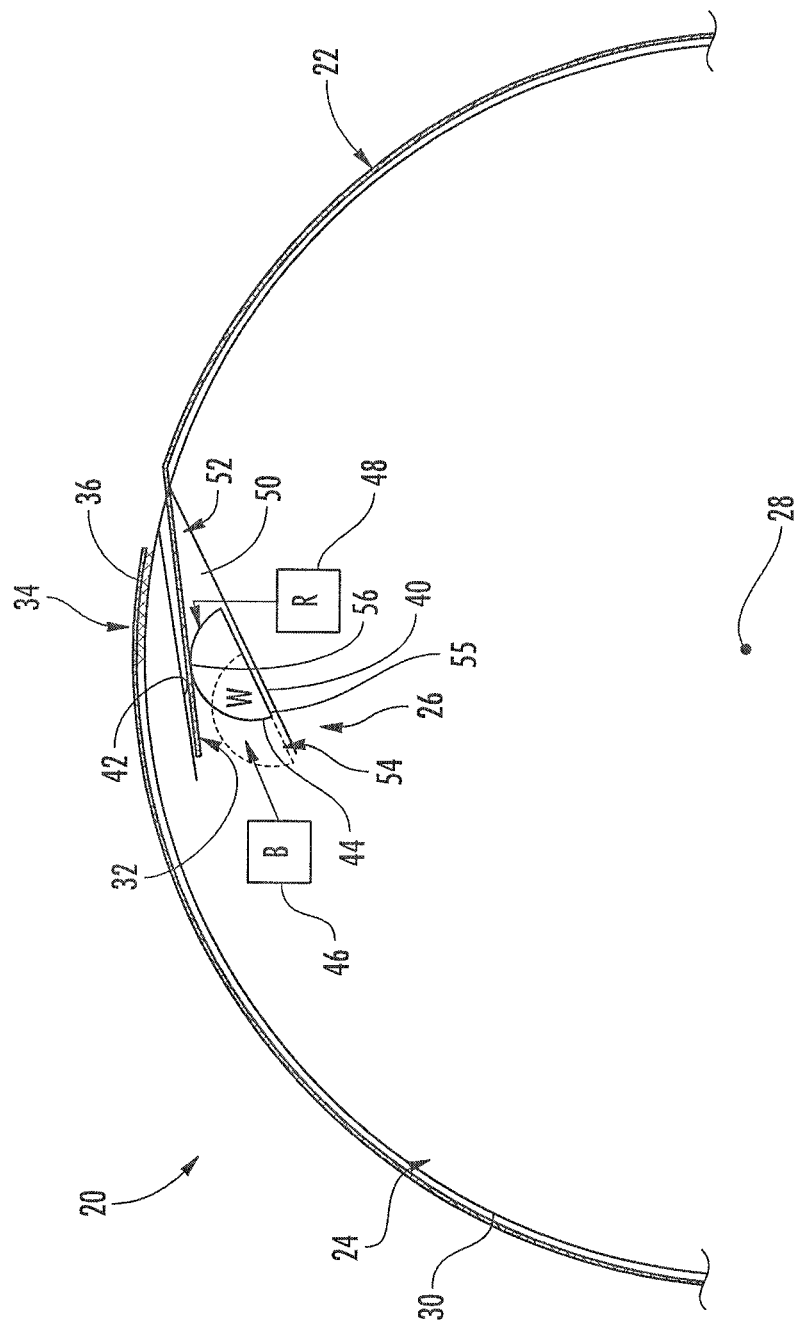
FIG. 1 is a sectional view of a substrate support with portions schematically shown according to an example embodiment.

FIG. 1 schematically illustrates a substrate support 20 according to an example embodiment. Substrate support 20 supports, holds, retains and secures a substrate 22. Examples of substrate 22 include, but are not limited to, a film, a sheet, a web, or other flexible media. In some embodiments, substrate 22 is configured to receive one or more deposited or applied materials, such as image forming materials. In other embodiments, substrate 22 underlies one or more additional substrates. As will be described hereafter, substrate support 20 reliably holds substrate 22 with a compact arrangement that is easy to use and may result in less damage to the substrate 22.

Substrate support 20 comprises drum 24 and substrate holder 26. Drum 24 comprises a cylindrical member configured to be rotatably driven about an axis 28. Drum 24 includes an outer circumferential surface 30 against and in contact with substrate 22 when substrate 22 is mounted to drum 24.

Substrate holder 26 comprises a mechanism configured to secure and hold a leading edge or leading edge portion 32 of substrate 22. In the example illustrated, a trailing edge portion 34 is secured relative to drum 24 by an adhesive 36 such that substrate 22 is held against surface 30, encircling drum 24. In other embodiments, edge portion 34 may be secured in other manners or may be unsecured.

As shown by FIG. 1, substrate holder 26 includes surfaces 40, 42, wedging member 44 (also labeled 'W' in FIG. 1), bias 46 and release 48. Surfaces 40, 42 are carried by drum 24 and converge towards one another to form a funnel-shaped channel or passage 50 having a mouth opening to the exterior of drum 24. Surfaces 40, 42 extend oblique to one another and are spaced so as to be separated by a first gap 52 at a first side of passage 50 and so as to be separated by a second gap 54 larger than the first gap 52 at a second opposite side of passage 50. In the example illustrated, surfaces 40 and 42 are recessed below circumferential surface 30, radially inward of surface 30. In other embodiments, one or both of surfaces 40, 42 and at least portions of passage 50 may be elevated with respect to surface 30 or may extend radially outward from surface 30. Passage 50 movably receives wedging member 44.

Wedging member 44 comprises a member captured or sandwiched between surfaces 40 and 42 within passage 50. For purposes of this disclosure, the term "wedging member" shall mean any member configured to ride or move along a first surface of a passage between (1) a first position in which the wedging member allows insertion or removal of one or more substrates between the wedging member and a second surface of the passage opposite to the first surface and (2) a second wedging position in which the wedging member wedges or pinches the one or more substrates between the wedging member and the second surface. In the example illustrated, wedging member 44 includes a flat surface 55 and an opposite curved surface 56. Flat surface 55 is configured to slide against and relative to surface 40 while curved surface 56 contacts substrate 22 and pinches substrate 22 against surface 42 when in the wedging position. In one embodiment, surface 55 may be coated with one or more friction reducing materials such as polytetrafluoroethylene (TEFLON). In another embodiment, surface 55 may be provided with friction reducing members such as rotatably supported ball bearings or rods. Wedging member 44 allows insertion of substrate 22 and thereafter grips or retains substrate 22 in place, inhibiting withdrawal of substrate 22 from passage 50.

In other embodiments, wedging member 44 may have other configurations. For example, wedging member 44 may alternatively comprise a member having a wedge, triangular or cuneiform character or shape. In yet another embodiment, wedging member 44 may comprise a rotatable member, facilitating easier movement of the wedging member 44 along surface 40. In one embodiment, wedging member 44 may comprise a ball or sphere. In another embodiment, wedging member 44 may comprise a cylinder, roller or rod.

Bias 46 (schematically illustrated) comprises a mechanism configured to resiliently urge or bias wedging member 44 in a wedging direction towards the first side of passage 50 having the narrower gap 52 (towards the wedging position). Bias 46 maintains wedging member 44 in contact with surfaces 40 and 42 to produce an initial friction that facilitates immediate wedging or pinching of substrate 22 once substrate 22 is inserted into passage 50 between wedging member 44 and surface 42. In one embodiment, bias 46 comprises a compression spring or a leaf spring bearing against or coupled to a spring supporting structure and operably coupled to wedging member 44, wherein wedging member 44 is between the compression spring or leaf spring and gap 52. In another embodiment, wedging member 44 may comprise a tension spring bearing against or coupled to a spring supporting structure and operably coupled to wedging member 44, wherein the tension spring is between wedging member 44 and gap 52. In some embodiments, bias 46 may be omitted, wherein rotation of drum 24 results in forces that urge wedging member 44 towards the wedging position.

For purposes of this disclosure, the term "coupled" shall mean the joining of two members directly or indirectly to one another. Such joining may be stationary in nature or movable in nature. Such joining may be achieved (a) with the two members, (b) with the two members and any additional intermediate members being integrally formed as a single unitary body with the two members, or (c) with the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members.

Release 48 (schematically illustrated) comprises a mechanism configured to apply force to and move wedging member 44 towards the larger gap 54 against the force of bias 46. Release 48 facilitates moving wedging member 44 so that surface 56 is spaced from surface 42 by a greater distance or is pressed against surface 42 and intervening substrate 22 by a lesser force, reducing frictional forces securing substrate 22 and allowing substrate 22 to be more easily withdrawn from passage 50. In some embodiments, release 48 may additionally be used in a similar manner to facilitate easier insertion of substrate 22 between surface 42 and surface 56 of wedging member 44. In one embodiment, release 48 comprises a lever or other structure manually actuatable to transmit manually applied forces to wedging member 44. In yet another embodiment, release 48 may comprise a lever or other structure that applies force to wedging member 44, wherein the force is derived from an electrical, pneumatic or hydraulic source.

In operation, substrate 22 may be secured to drum 24 by holding mechanism 26 in the following manner. Leading edge 32 is initially inserted through gap 52 into passage 50 between surface 42 and surface 56 of wedging member 44. During such insertion, substrate 22 exerts a force upon wedging member 44 to move wedging member 44 towards the larger gap 54 against the force of bias 46 to the insertion/withdrawal position shown in broken lines. In the insertion position, wedging member 44 is either spaced from surface 42 to facilitate insertion of substrate 22 between curved surface 56 of wedging member 44 and surface 42 or exerts less force against surface 42 such that substrate 22 may be inserted between surface 42 and surface 56 of wedging member 44.

Once the force exerted by substrate 22 against bias 46 during insertion of substrate 22 or after insertion of wedging member 44 towards gap 52 becomes less than the force of bias 46, bias 46 automatically moves wedging member 44 towards gap 52, causing surface 56 to pinch substrate 22 against surface 42. Forces tending to withdraw edge 32 from passage 50 also result in movement of wedging member 44 towards gap 52 which further increases the force by which surface 56 pinches substrate 22 against surface 42. In the example illustrated, substrate 22 is wrapped about circumferential surface 30 of drum 24 with trailing edge portion 34 secured relative to drum 24 by adhesive 36.

To remove and replace substrate 22, release 48 is actuated to the insertion/withdrawal position shown in broken lines, allowing leading edge portion 32 to be withdrawn from passage 50. Trailing edge portion 34 is separated from drum 24.

Thus, substrate holder 26 facilitates quick and relatively easy securement of substrate 22 to drum 24. Leading edge portion 32 of substrate 22 is merely inserted into passage 50. Wedging member 44 automatically responds and automatically pinches substrate 22 to secure leading edge portion 32 of substrate 22. In the example illustrated, this securement may be manually performed without tools. In the example illustrated, because edge portion 34 is secured relative to drum 24 over and above or at least partially overlapping wedging member 44, larger or longer substrates 22 may be secured to drum 24. Because leading edge portion 32 is merely pinched against surface 42, apertures through leading edge portion 32 are not used for securement of substrate 22. As a result, the integrity of leading edge portion 32 is maintained such that leading edge portion 32 is less likely to tear or become damaged.

Figure 2:
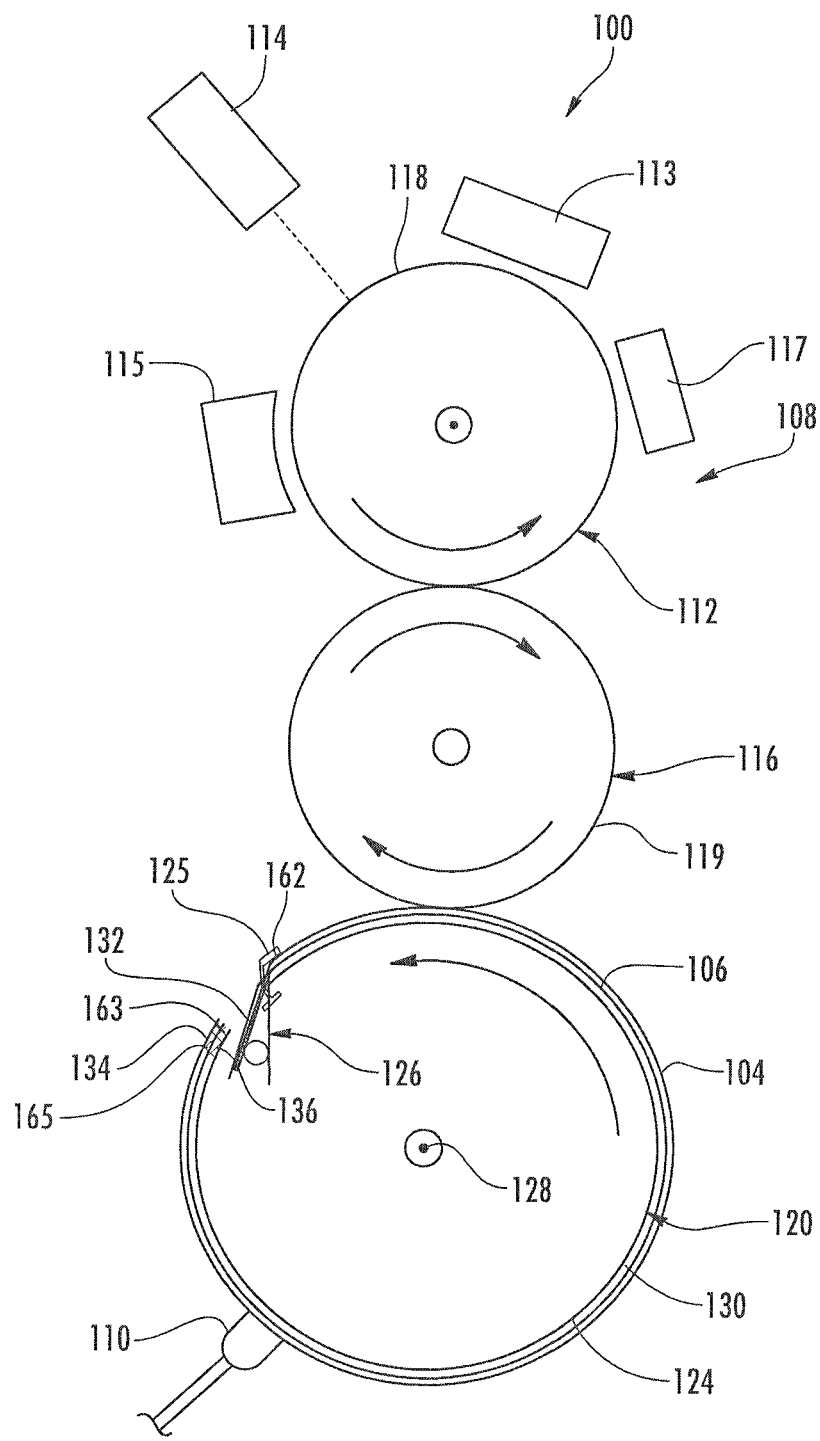
FIG. 2 is a side elevational view of a printing system according to an example embodiment.

FIGS. 2-13 illustrate a printing system 100 including a substrate support similar to the substrate support described in FIG. 1. As shown by FIG. 2, printing system 100 (schematically illustrated) forms an image upon a first substrate, print medium 104, overlying a second substrate, impression medium 106. Printing system 100 includes image forming device 108, substrate remover 110 and substrate support 120.

Image forming device 108 comprises a mechanism configured to form and deposit or apply an image to print medium 104 carried by substrate support 120. In the example illustrated, image forming device 108 includes drum 112, charger 113, imager 114, ink developer 115, intermediate image transfer member 116 and cleaning station 117. Drum 112 comprises a movable support structure having a photoconductive surface 118. Drum 112 is configured to be rotationally driven by a motor and transmission (not shown). As a result, distinct surface portions of drum 112 are transported between stations including charger 113, imager 114, ink developer 115, transfer member 116 and cleaning station 117. In other embodiments, photoconductive surface 118 may be driven between such stations in other manners. For example, photoconductive surface 118 may be provided as part of an endless belt supported by a plurality of rollers.

Photoconductive surface 118, also sometimes referred to as a photoreceptor, comprises a multi-layered structure configured to be charged and to have portions selectively discharged in response to optical radiation such that charged and discharged areas form a discharged image to which charged printing material is adhered.

Charger 113 comprises a device configured to electrostatically charge surface 118 of drum 112. In one embodiment, charger 113 comprises a charge roller which is rotationally driven while in sufficient proximity to drum 112 so as to transfer a negative static charge to surface 118 of drum 112. In other embodiments, charger 113 may alternatively comprise one or more corotrons or scorotrons. In still other embodiments, other devices for electrostatically charging photoconductive surface 118 may be employed.

Imager 114 comprises a device configured to selectively electrostatically charge photoconductive surface 118 so as to form an image. In the example shown, imager 114 comprises a scanning laser which is moved across surface 118 as drum 112 is rotated. Those portions of surface 118 which are impinged by light or laser are electrostatically discharged to form an image (or latent image) upon surface 118. In other embodiments, imager 114 may alternatively comprise other devices configured to selectively emit or selectively allow light to impinge upon surface 118. For example, in other embodiments, imager 114 may alternatively include one or more shutter devices which employ liquid crystal materials to selectively block light and to selectively allow light to pass to surface 118. In yet other embodiments, imager 114 may alternatively include shutters which include micro or nano light-blocking shutters which pivot, slide or otherwise physically move between light blocking and light transmitting states.

Ink developer 115 comprises a device configured to apply printing material to surface 118 based upon the electrostatic charge upon surface 118 and to develop the image upon surface 118. According to one embodiment, ink developer 115 comprises a binary ink developer (BIDs) circumferentially located about drum 112. Such ink developers are configured to form a substantially uniform 6μ thick electrostatically charged layer composed of approximately 20% solids which is transferred to surface 118. In one embodiment, developer 115 may apply a liquid comprising colorant particles in a liquid carrier. In one embodiment, the liquid carrier comprises an ink carrier oil, such as Isopar, and one or more additional components such as a high molecular weight oil, such as mineral oil, a lubricating oil and a defoamer. In one embodiment, the printing material, including the liquid carrier and the colorant particles, comprises HEWLETT-PACKARD ELECTRO INK commercially available from Hewlett-Packard. In yet other embodiments, ink developer 115 may comprise another device configured to transfer other electrostatically charged liquid printing materials or toners to surface 118. In still other embodiments, developer 115 may be configured to apply dry toners to surface 118.

Intermediate image transfer member 116 comprises a member configured to transfer the printing material upon surface 118 to a print medium 104 carried by substrate support 120. Intermediate transfer member 116 includes an exterior surface 119 which is resiliently compressible and which is also configured to be electrostatically charged. Because surface 119 is resiliently compressible, surface 119 conforms and adapts to irregularities in print medium 104. Because surface 119 is configured to be electrostatically charged, surface 119 may be charged so as to facilitate transfer of printing material from surface 118 of drum 112 to surface 119.

Cleaning station 117 comprises one or more devices configured to remove residual printing material from surface 118 prior to surface areas 118 of drum 112 being once again charged at charger 113.

Although image forming device 108 has been illustrated and described as a liquid electrophotographic (LEP) printer (sometimes embodied as part of an offset color press), in another embodiment, image forming device 108 may have other configurations. For example, as noted above, in other embodiments, image forming device 108 may be configured to apply dry toners to print medium 104. In another embodiment, image forming device 108 may alternatively be configured to directly apply liquid ink to print medium 104 using one or more inkjet printheads, such as electroresistive or piezoresistive print heads, while the print medium 104 is supported by substrate support 120.

Substrate remover 110 comprises a mechanism configured to lift and remove print medium 104 from substrate support 120. In one embodiment, substrate remover 110 may include suction elements for removing and conveying print medium 104, after an image has been formed thereon, to an output tray. In other embodiments, other mechanisms may be used to remove or separate print medium 104 from substrate support 120.

Substrate support 120 supports both print medium 104 and the underlying impression medium 106 while images are being transferred onto print medium 104 by image forming device 108. Substrate support 120 includes drum 124, grippers 125 and substrate holder 126. Drum 124 comprises a cylindrical member configured to be rotatably driven about an axis 128. Drum 124 includes an outer circumferential surface 130 against and in contact with impression medium 106 when impression medium 106 is mounted to drum 124. Surface 130 further supports the print medium 104 overlying impression medium 106.

Grippers 125 comprise mechanisms carried by drum 124 which are configured to grip and hold print medium 104 in place over impression medium 106. In the example illustrated, grippers 125 are circumferentially spaced from substrate holder 126 and extend through impression medium 106 to contact and grip print medium 104. In other embodiments, grippers 125 may have other configurations or may be at other locations. While the leading edge 162 of print medium 104 is gripped by grippers 125, the trailing edge 163 of print medium 104 is secured relative to drum 124 by an adhesive 165. As a result, print medium 104 encircles or wraps about drum 124 over impression medium 106.

Substrate holder 126 comprises a mechanism configured to secure and hold a leading edge or leading edge portion 132 of impression medium 106. In the example illustrated, a trailing edge portion 134 is secured relative to drum 124 by an adhesive 136 such that impression medium 106 is held against surface 130, encircling drum 124. In other embodiments, edge portion 134 may be secured in other manners.

Impression medium 106 comprises a sheet of material underlying print medium 104. Impression medium 106 serves to absorb print material from intermediate transfer member 116 in circumstances where print medium 104 may not be properly positioned on drum 124 or where grippers 125 may have accidentally failed to grip and hold any print medium 104 on drum 124. By absorbing printing material or toner in such circumstances, impression medium 106 inhibits the printing material from being deposited directly upon drum 124 and from being retransmitted back to intermediate transfer member 116 where it might damage surface 119 of intermediate transfer member 116.

Figure 3:
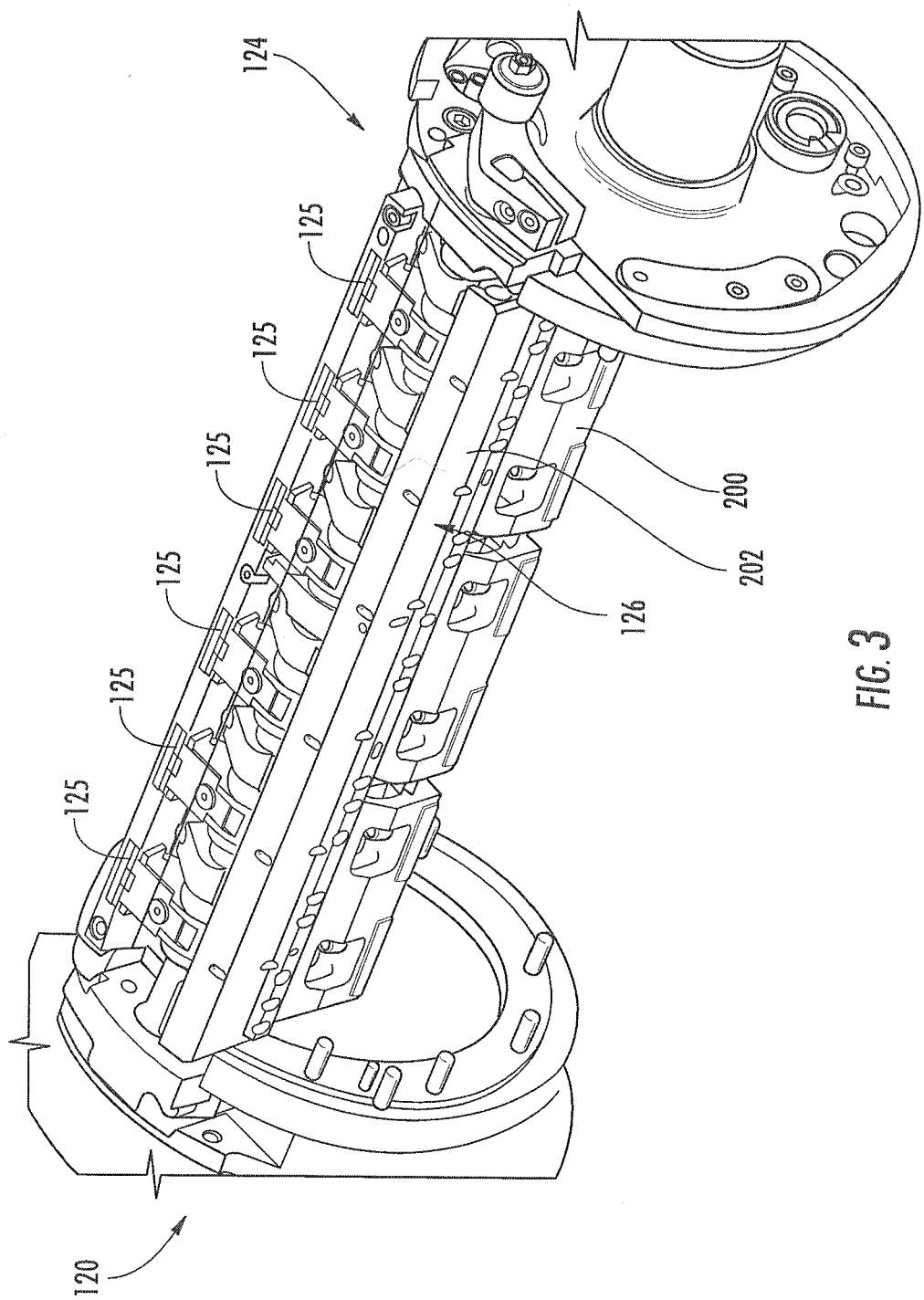
FIG. 3 is a perspective view of a substrate support of the printing system of FIG. 2 according to example embodiment with portions omitted for purposes of illustration.
Figure 4:
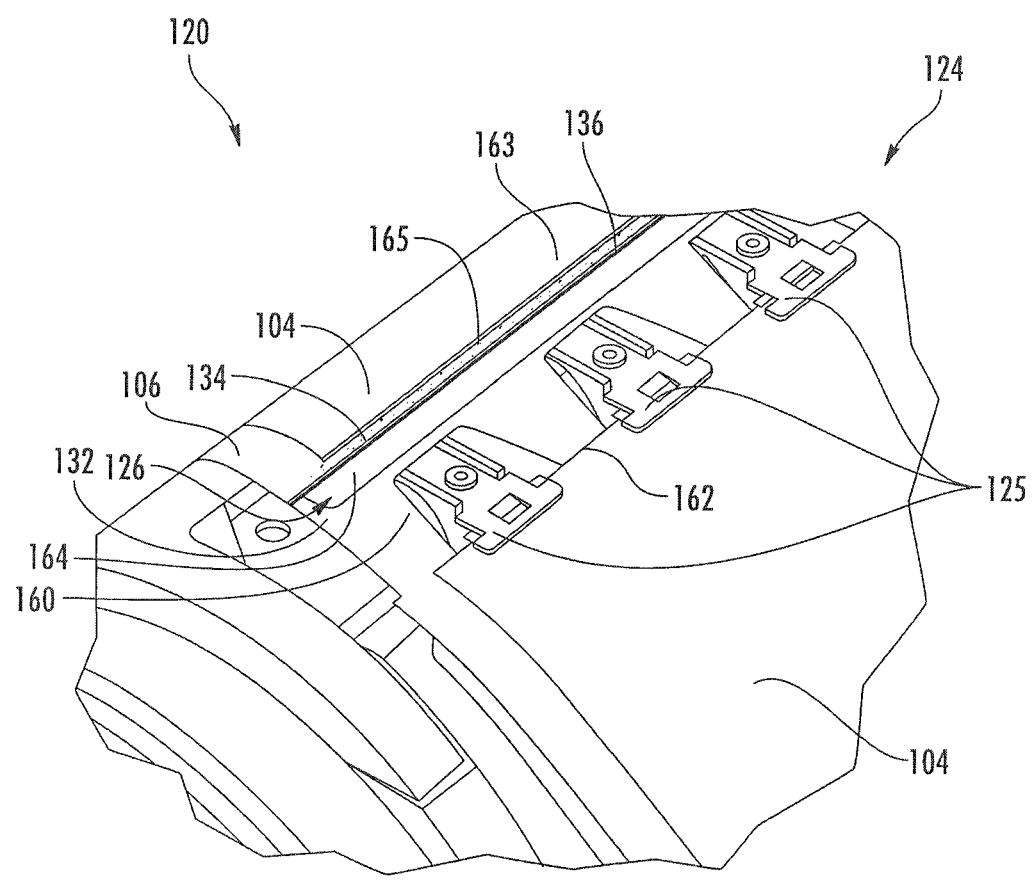
FIG. 4 is a fragmentary perspective view of the substrate support of FIG. 3 supporting an impression medium and a print medium according to an example embodiment.

FIG. 3 illustrates substrate support 120 in more detail. FIG. 3 illustrates substrate support 120 with a surface of drum 124 being hidden or omitted for purposes of illustration. As shown by FIG. 3, grippers 125 are axially spaced along drum 124 in a row circumferentially downstream from substrate holder 126. As shown by FIG. 4, grippers 125 project through apertures 160 in impression medium 106. Grippers 125 are configured to clamp about opposite faces of medium 104 (shown in FIG. 2). Grippers 125 engage print medium 104 at a plurality of spaced locations along edge 162 of print medium 104 (shown in FIG. 2). As further shown by FIG. 4, impression medium 106 wraps about drum 124, with leading edge or leading edge portion 132 held by substrate holder 126 and with trailing edge or trailing edge portion 134 secured relative to drum 124 by adhesive 136. In the example illustrated, substrate holder 126 provides a surface 164 onto which trailing edge portion 134 may be secured over a portion of substrate holder 126, facilitating securement of larger or longer impression media 106 which facilitates printing upon larger or longer print medium 104.

Figure 5:
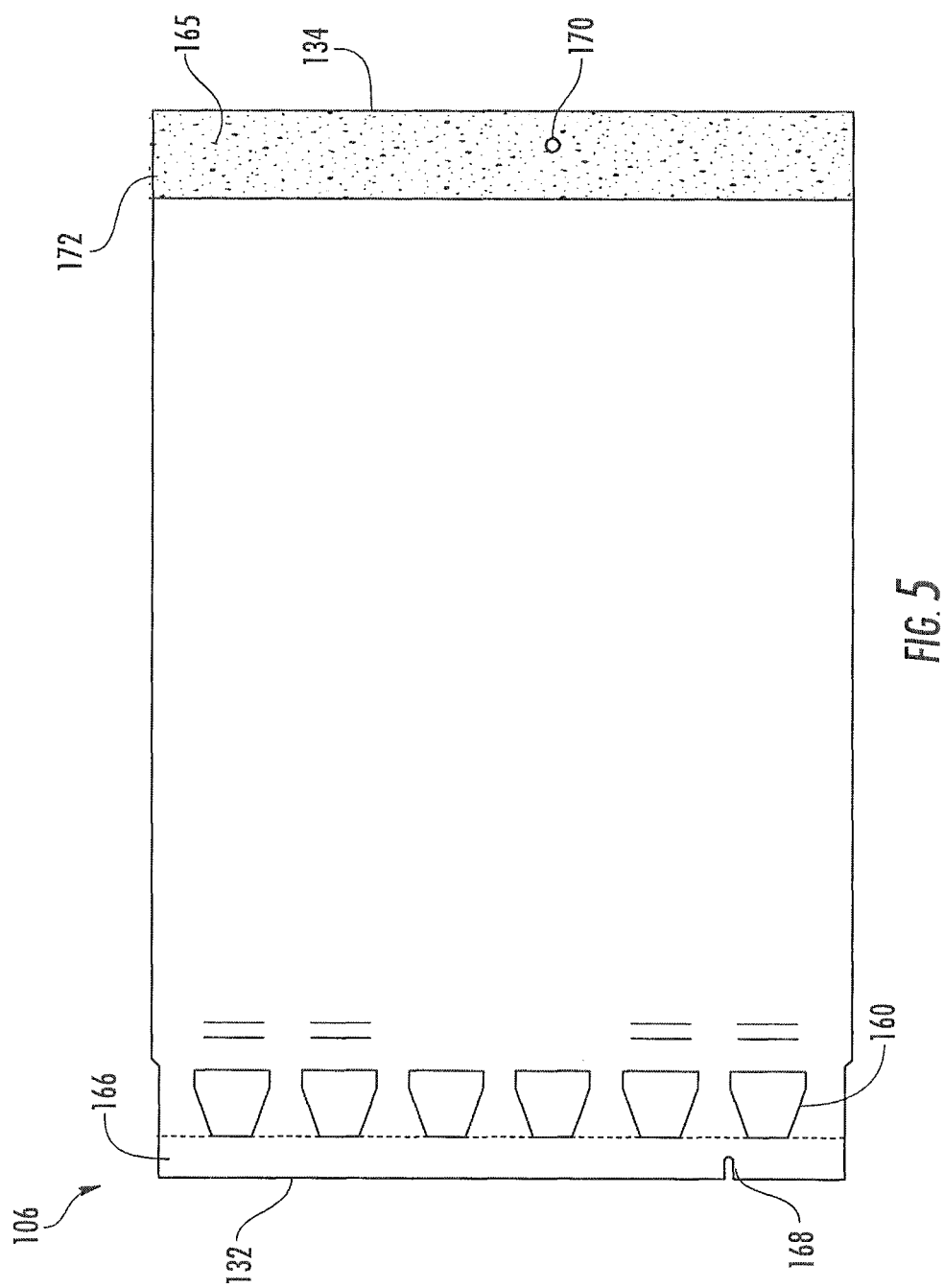
FIG. 5 is a top plan view of the impression medium of FIG. 4 according to an example embodiment.

FIG. 5 illustrates impression medium 106 in more detail. As shown by FIG. 5, impression medium 106 comprises an elongated sheet, film, of paper, or the like having a leading edge 132, a trailing edge 134, apertures 160, imperforate grip band 166, orientation notch 168, access hole 170 and double-sided glue or adhesive zone 172. Leading edge 132 is configured to be inserted into substrate holder 126. Trailing edge 134 is adhered to and on top of substrate holder 126. Apertures 160 are spaced along and proximate to leading edge 132 and are sized and located such that grippers 125 may project and extend through apertures 160 into gripping engagement with print medium 104 as shown in FIG. 4.

Imperforate grip band 166 comprises a band or strip extending from leading edge 132 to an edge of each of apertures 160. Imperforate grip band 166 omits any through holes and is configured to be gripped or pinched on opposite sides or faces by portions of the substrate holder 126 as will be described hereafter. Because band 166 lacks through holes (completely surrounded holes) which receive pins or projections, band 166 lacks weakened points which may be subject to tearing or damage. Notch 168 comprises a single slit extending into band 166, wherein notch 168 is located to receive an orientation pin (described hereafter) for orienting impression medium 106 with respect to substrate holder 126.

Access hole 170 comprises an aperture extending through impression medium 106 proximate to trailing edge 134. As will be described in more detail hereafter, access hole 170 is located to facilitate insertion of a tool therethrough for manually actuating a release mechanism when withdrawing impression medium 106 from substrate holder 126.

Double-sided glue or adhesive zone 172 comprises a surface area or region on both sides of impression medium 106 adjacent to and along trailing edge 134. In one embodiment, zone 172 includes a pressure sensitive adhesive or an actuatable adhesive 136 (shown in FIG. 4) on a bottom side for adhering to substrate holder 126 and a pressure sensitive adhesive or an actuatable adhesive 165 on a top or upper face for adhering to trailing edge 163 of print medium 104 (shown in FIG. 4). In another embodiment, zone 172 comprises regions configured to receive the glue or adhesives 136, 165. In other embodiments, impression medium 106 may have other configurations and may be formed from other materials.

Figure 6:
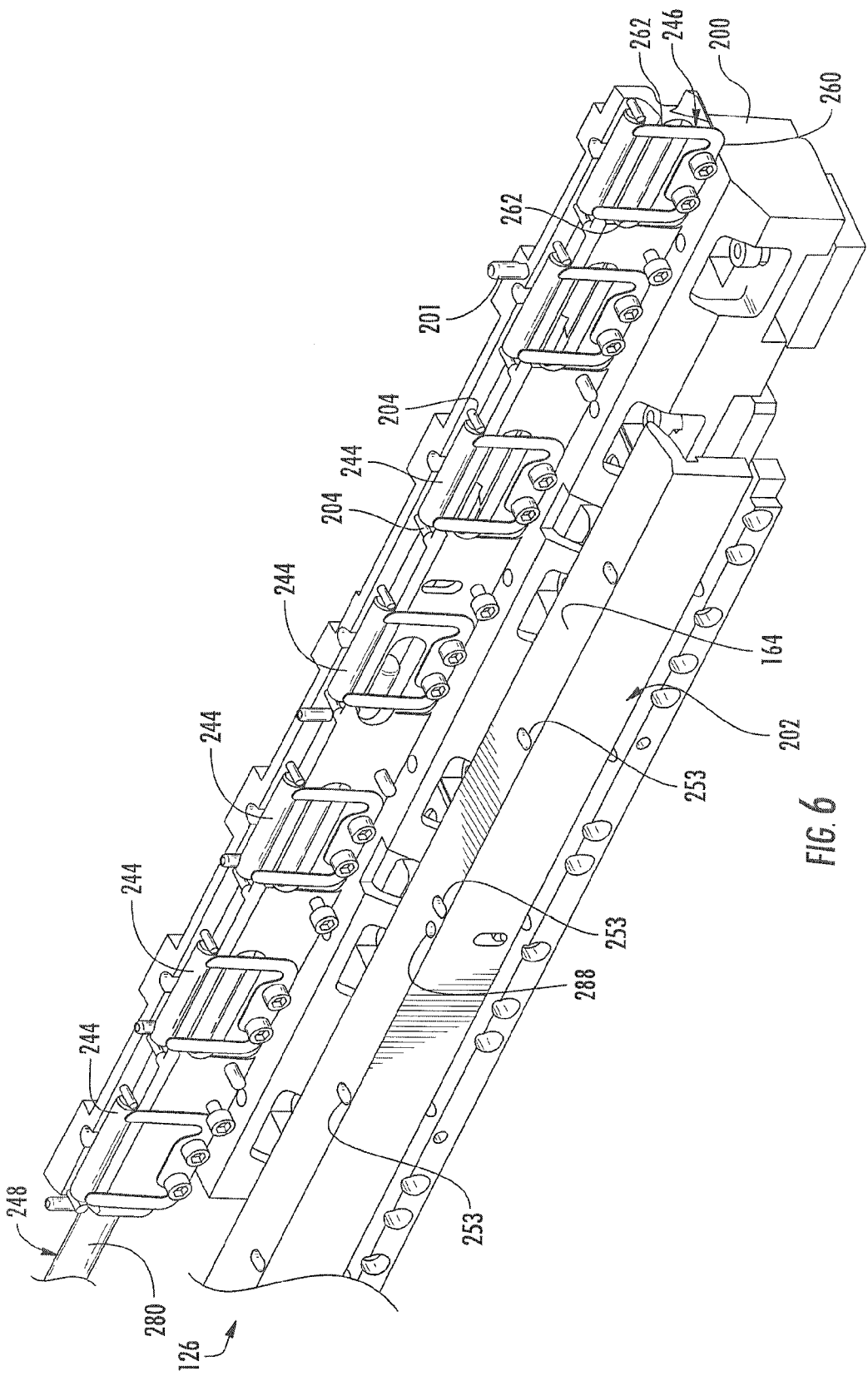
FIG. 6 is a first exploded perspective view of a substrate holder of the substrate support of FIG. 3 according to an example embodiment.
Figure 7:
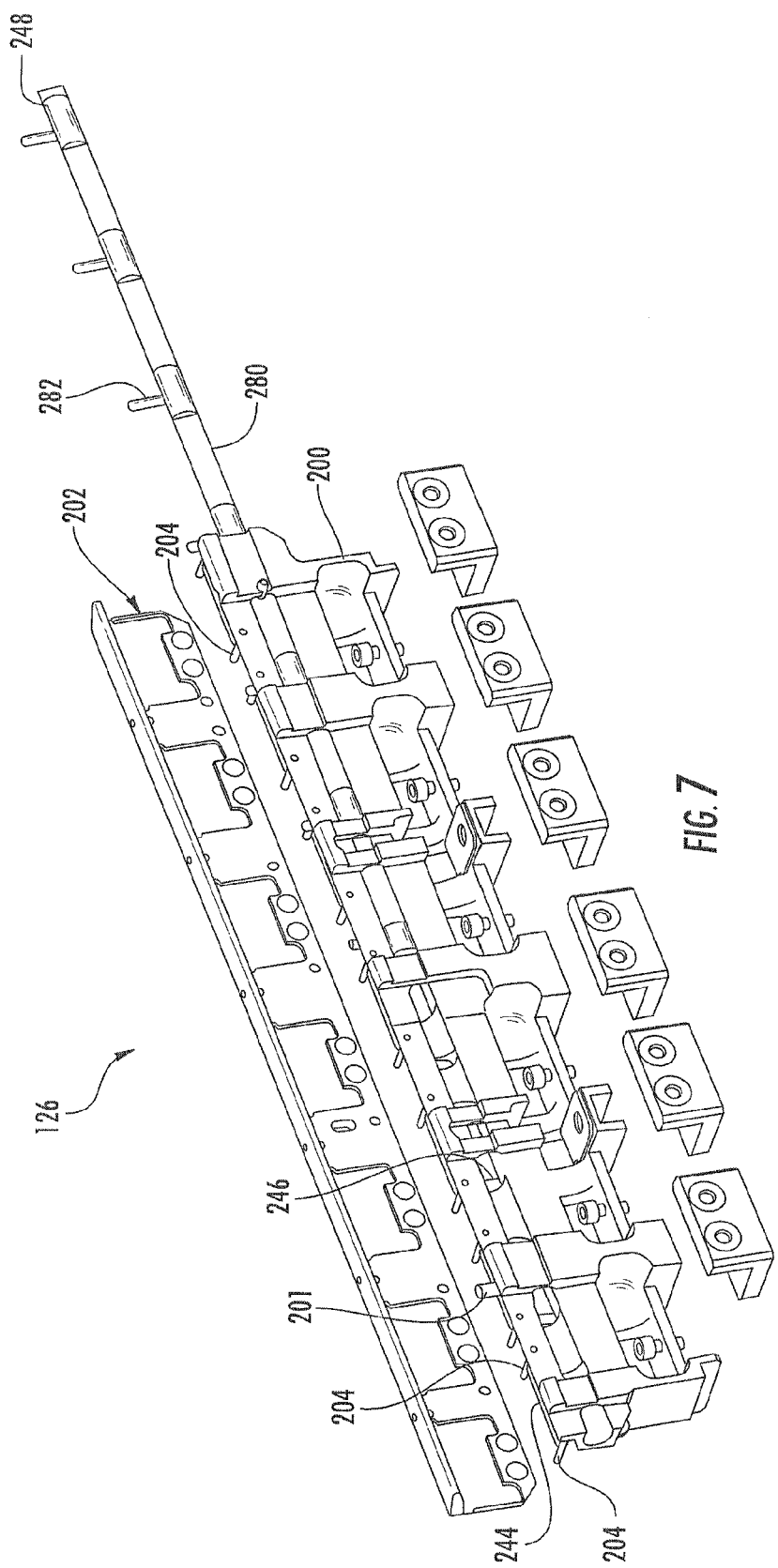
FIG. 7 is a second exploded perspective view of the substrate holder of FIG. 6 according to an example embodiment.
Figure 8:
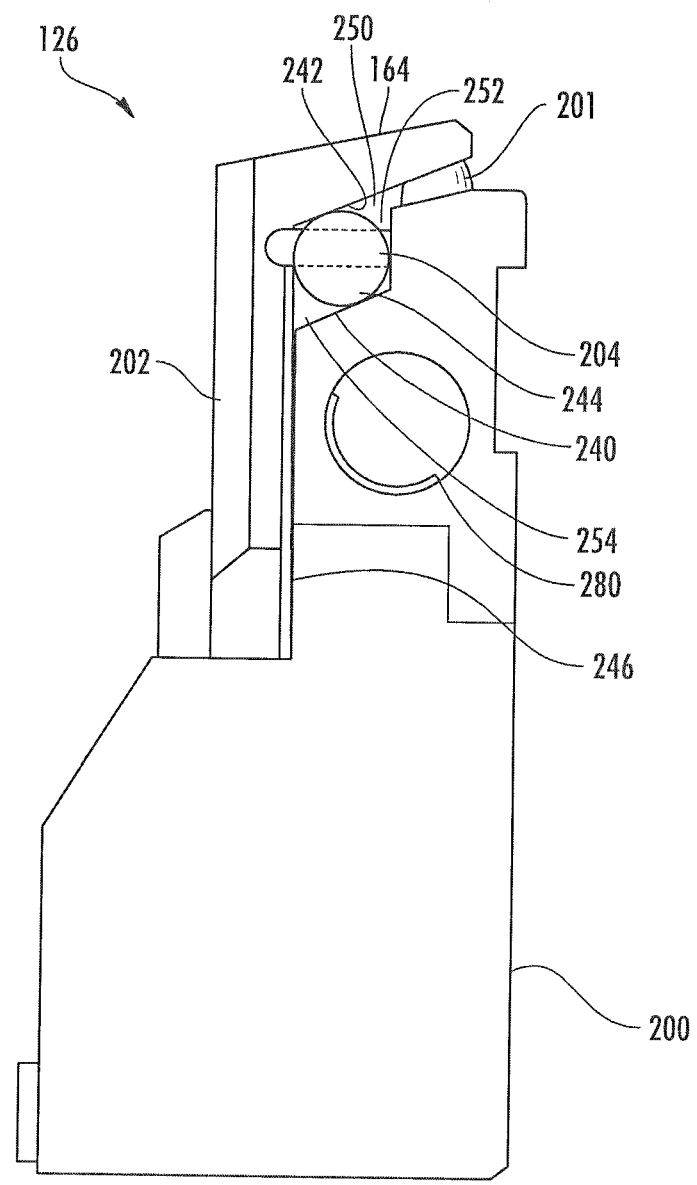
FIG. 8 is a side elevational view of the substrate holder of FIG. 6 according to an example embodiment.

FIGS. 6-13 illustrate substrate holder 126 in more detail. FIGS. 6 and 7 are exploded perspective views of substrate holder 126 while FIG. 8 is a side elevational view of an assembled substrate holder 126. As shown by FIGS. 6-8, substrate holder 126 includes base 200, orientation projection 201, counter anvil 202, guides 204, wedging members 244, biases 246 and release 248 (shown in FIGS. 6 and 7). Base 200 comprises one or more structures forming a support, bracket or frame carried by drum 124 (shown in FIGS. 3 and 9) and supporting the remaining components of substrate holder 126. In one embodiment, base 200 is mounted to drum 124. In other embodiments, base 200, or at least portions of base 200, may be integrally formed as a single unitary body with drum 124.

Figure 9:
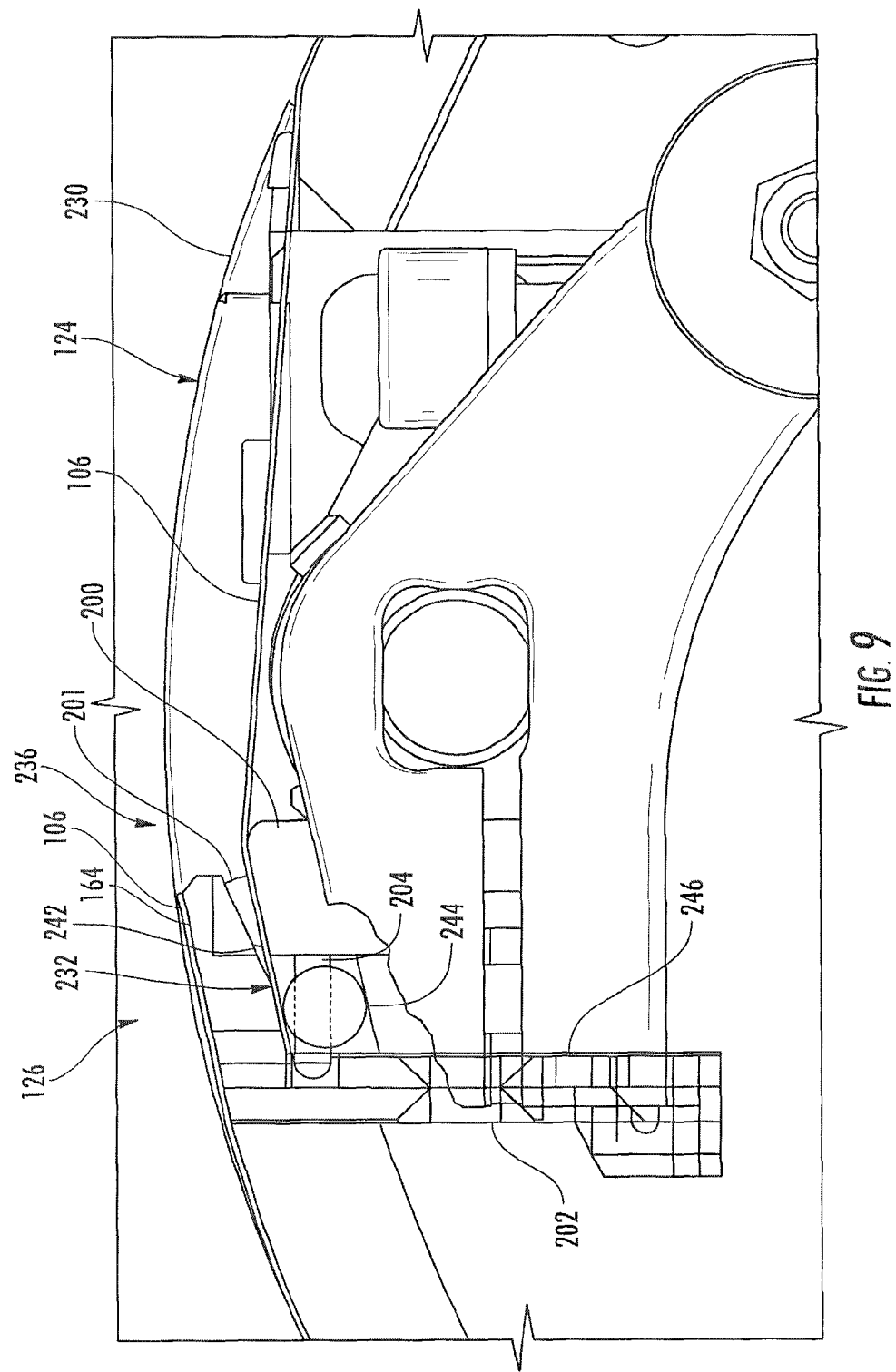
FIG. 9 is a sectional view of the substrate support of FIG. 3 according to an example embodiment supporting the impression medium.
Figure 10:
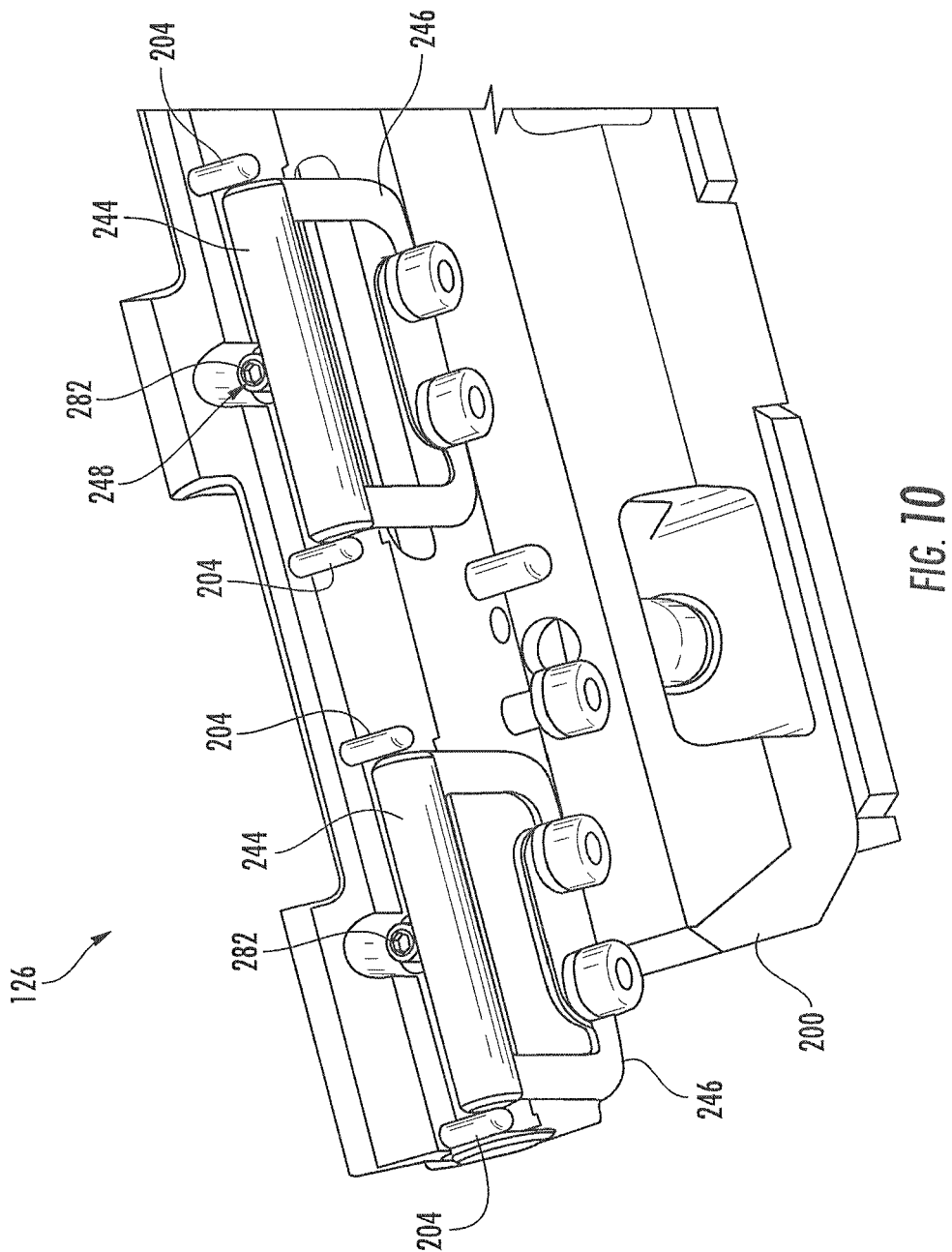
FIG. 10 is a fragmentary perspective view of the substrate holder of FIG. 6 according to an example embodiment.

Orientation projection 201 comprises a structure extending from base 200 that is configured and located to be received by orientation notch 168 of impression medium 106 (shown in FIG. 5) when leading edge portion 232 of medium 106 is inserted into holder 126 as shown in FIG. 9. Orientation projection 201 facilitates insertion of impression medium 106 at a proper orientation into holder 126. In the example illustrated, projection 201 comprises a pin. In other embodiments, projection 201 may have other configurations or may be omitted.

Counter anvil 202 comprises one or more structures mounted to base 200 so as to form passage 250. As shown by FIG. 8, counter anvil 202 cooperates with base 200 to form passage 250 containing wedging members 244 (one of which is shown). In particular, base 200 provides surface 240 while anvil 202 provides surface 242 which are spaced to form passage 250. Surfaces 240, 242 extend oblique to one another and are spaced so as to be separated by a first gap 252 at a first side of passage 250 and so as to be separated by a second gap 254 larger than the first gap 252 at a second opposite side of passage 250.

According to one example embodiment, surfaces 240, 242 extend along planes which are angled with respect to one another from between 8 degrees to 20 degrees and nominally about 13.5 degrees. In other embodiments, the angle between surfaces 240 and 242 may vary depending upon a thickness of impression medium 106, the allowable space for movement of wedging members 244 (the size of wedging members 244), anticipated pulling force presented by medium 106, and a rigidity of surfaces 240, 242 and wedging members 244. Although illustrated as substantially linear or planar, surfaces 240, 242 may have other configurations. For example, one or both of such surfaces may be curved. Although illustrated as being provided by separate structures, surfaces 240, 242 may be at least partially provided by a same unitary structure.

In the example illustrated, surfaces 240 and 242 are recessed below circumferential surface 230, radially inward of surface 230. In other embodiments, one or both of surfaces 240, 242 and at least portions of passage 250 may be elevated with respect to, or radially outward from, surface 230. Passage 250 movably receives wedging member 244.

As further shown by FIGS. 8 and 9, counter anvil 202 additionally provides a trailing edge or substrate tail securement surface 164 onto which trailing edge portion 134 may be secured over a portion of wedging member 244. As a result, larger or longer impression media 106 may be wrapped about 124, facilitating printing upon larger or longer print medium 104.

In the example illustrated, anvil 202 additionally includes a viewing opening 253 (shown in FIGS. 6 and 11) extending through surface 164 to passage 250 near gap 254. Viewing opening 253 allows a person to visually verify when leading edge 232 of medium 106 has been fully or sufficiently inserted into passage 250 between surface 242 and wedging member 244. In other embodiments, viewing opening 253 may be omitted.

Guides 204 comprise structures configured to direct and guide movement of wedging members 244 within their corresponding passages 250. Guides 204 reduce potential skewing of wedging members 244 as they move between gaps 252, 254. As a result, wedging members 244 pinch or wedge against medium 106 and surface 242 along a line of contact substantially parallel to leading edge 232 for a more uniform application of holding force to medium 106.

In the example illustrated, guides 204 comprise pins extending from base 200 on opposite sides of wedging members 244. In other embodiments, guides 204 may have other configurations. For example, in other embodiments, guides 204 may comprise projections or other structures mounted to, welded to, bonded to, or integrally formed as part of a single unitary body with base 200. In yet other embodiments, guides 204 may alternatively be supported by and extend from counter anvil 202. In some embodiments, guides 204 may be omitted.

Each of wedging members 244 comprises a member captured or sandwiched between surfaces 240 and 242 within passage 250. As shown by FIG. 6, in the example illustrated, each wedging member 244 comprises a cylindrical locking roller having axial ends retained between opposite guides 204. The cylindrical wedging member 244 is configured to roll against and relative to surface 240 while contacting medium 106 and pinching medium 106 against surface 242 when in the wedging position shown in FIG. 9. Wedging members 244, collectively, allow insertion of medium 106 and thereafter grip or retain medium 106 in place, inhibiting withdrawal of medium 106 from passage 250.

In other embodiments, wedging members 244 may have other configurations. Although substrate holder 126 is illustrated as including seven wedging members 244 spaced from one another and aligned with one another along a line parallel to axis 128 of drum 124 (shown in FIG. 2), in other embodiments, substrate holder 126 may include a fewer or greater number of such wedging members 244. For example, in one embodiment, substrate holder 126 may include a single wedging member 244 comprising a single roller retained between a pair of guides 204. In lieu of comprising cylindrical rollers, each wedging member 244 may alternatively comprise a member having a wedge, triangular or cuneiform character or shape. In yet another embodiment, each wedging member 244 may be similar to wedging member 44 as shown and described above with respect to FIG. 1 or may comprise a ball or sphere.

Biases 246 comprise mechanisms configured to resiliently urge or bias a corresponding wedging member 244 towards the first side of passage 250 having the narrower gap 252. Each bias 246 maintains a corresponding wedging member 244 in contact with surfaces 240 and 242 to produce an initial friction that facilitates immediate wedging or pinching of medium 106 once the medium 106 is inserted into passage 250 between wedging member 244 and surface 242.

As shown by FIG. 6, in the example illustrated, each bias 246 comprises a leaf spring having a base portion or mounting portion 260 that is fastened to base 200 and a pair of resiliently flexible fingers or prongs 262 extending into contact with a corresponding associated wedging member 244. Each of prongs 262 resiliently urges its associated wedging member 244 towards the narrower gap 252 within passage 250 (shown in FIG. 8).

In other embodiments, each bias 246 may have another configuration. In other embodiments, each bias 246 may comprise a compression spring, a differently configured leaf spring or a tension spring configured and located so as to resiliently urge an associated wedging member 244 towards the narrower gap 252. In still other embodiments, a single bias, such as a single leaf spring, may be configured to resiliently urge each of wedging members 244 towards the narrower gap 252.

Release 248 comprises a mechanism configured to apply force to and move wedging member 244 towards the larger gap 254 against the force of bias 246. Release 248 facilitates moving wedging member 244 so that wedging member 244 is spaced from surface 242 by a greater distance or is pressed against surface 242 and intervening medium 106 by a lesser force, reducing frictional forces securing medium 106 and allowing medium 106 to be more easily withdrawn from passage 250 with less resistance. In some embodiments, release 248 may additionally be used in a similar manner to facilitate easier insertion of medium 106 between surface 242 and wedging members 244.

FIG. 9 illustrates medium 106 being held by substrate holder 126 after leading edge 232 has been initially inserted through gap 252 into passage 250 between surface 242 and the curved circumferential surface of wedging member 244. During such insertion, wedging member 244 may also be moved or rolled towards the larger gap 254 against the force of a corresponding bias 246 to an insertion position using release 248. Once the force exerted by medium 106 against bias 246 during insertion of medium 106 or after insertion of medium 106 becomes less than the force of bias 246, biases 246 automatically move and return wedging members 244 towards gap 252, causing each wedging member 244 to pinch media 106 against surface 242. Forces tending to withdraw edge 232 from passage 250 also result in movement of wedging members 244 towards gap 252 which further increases the force by which wedging members 244 pinch medium 106 against surface 242. In the example illustrated, medium 106 is wrapped about circumferential surface 230 of drum 124 with trailing edge portion 134 secured relative to drum 124 on surface 164 by adhesive 136.

To remove and replace medium 106, release 248 is actuated, allowing leading edge portion 232 to be withdrawn from passage 250. Trailing edge portion 134 is separated from drum 124. In the example illustrated, release 248 is configured to be manually actuated and is configured to release wedging members in a simple and efficient manner.

Figure 11:
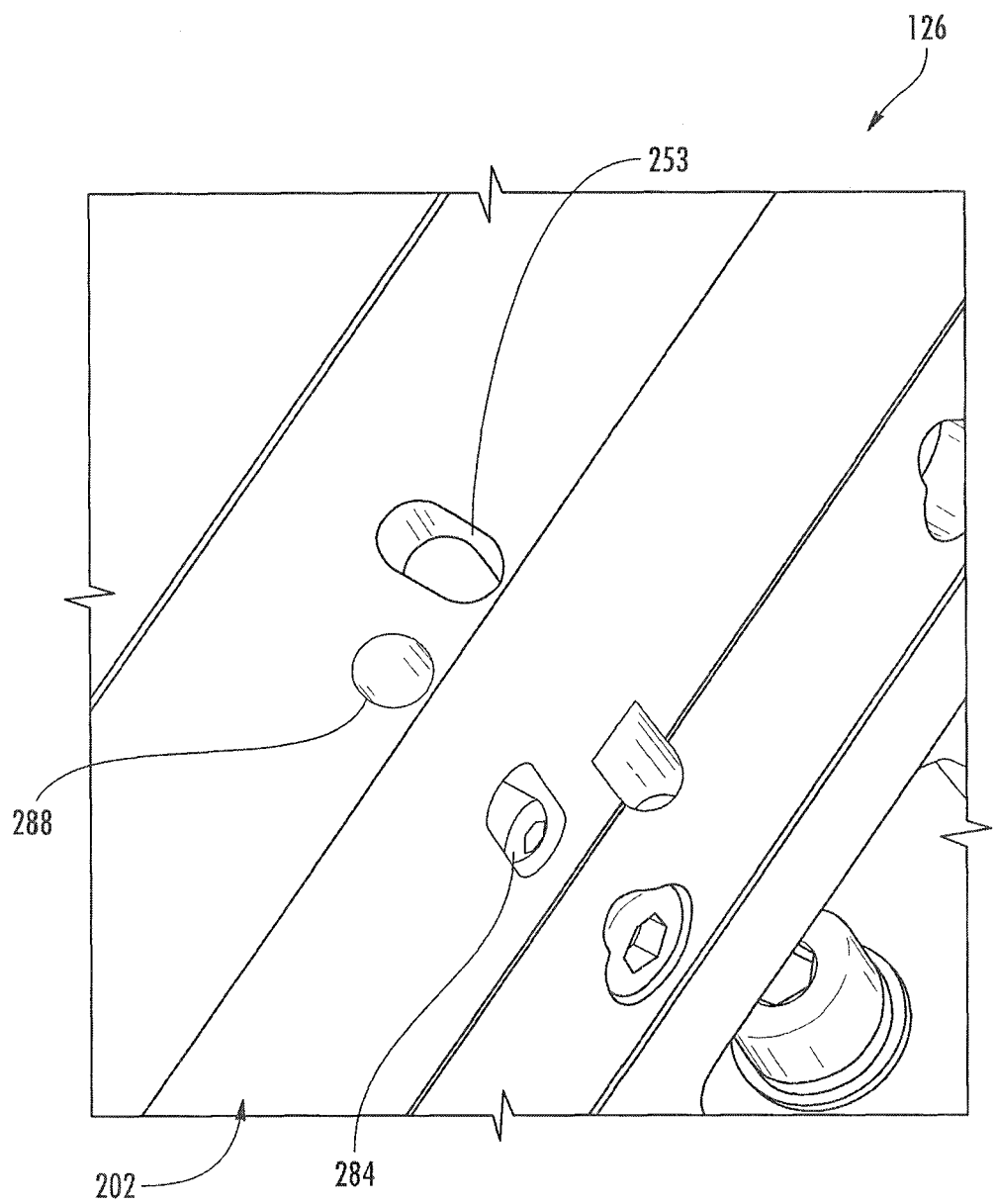
FIG. 11 is a fragmentary top perspective view of the substrate holder of FIG. 3 according to an example embodiment.
Figure 12:
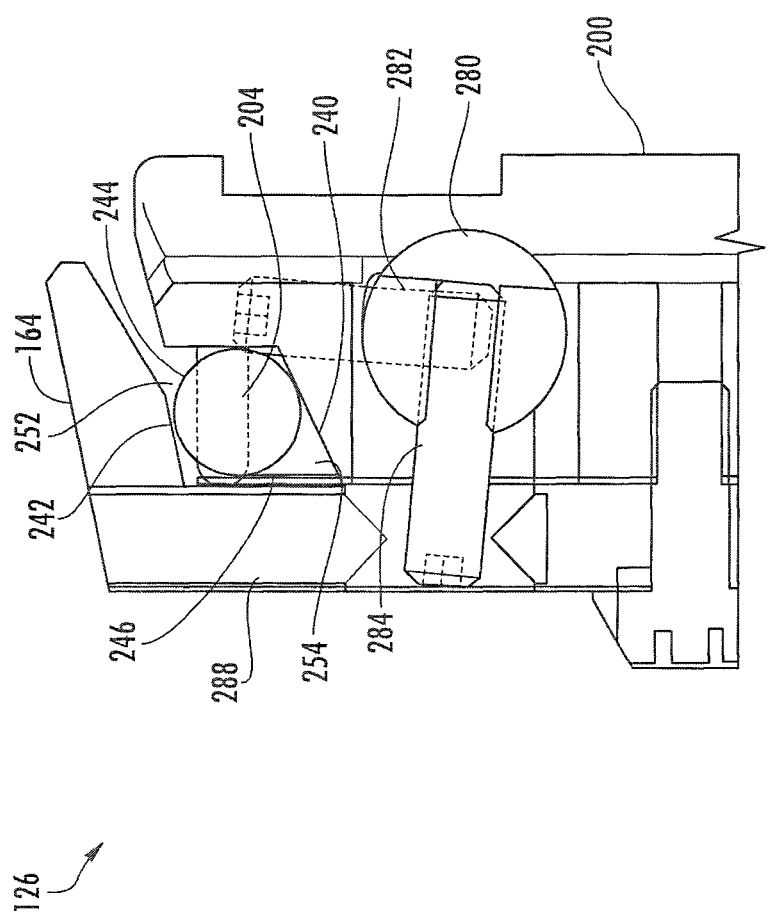
FIG. 12 is a sectional view of the substrate holder of FIG. 3 illustrating a release according to an example embodiment.
Figure 13:
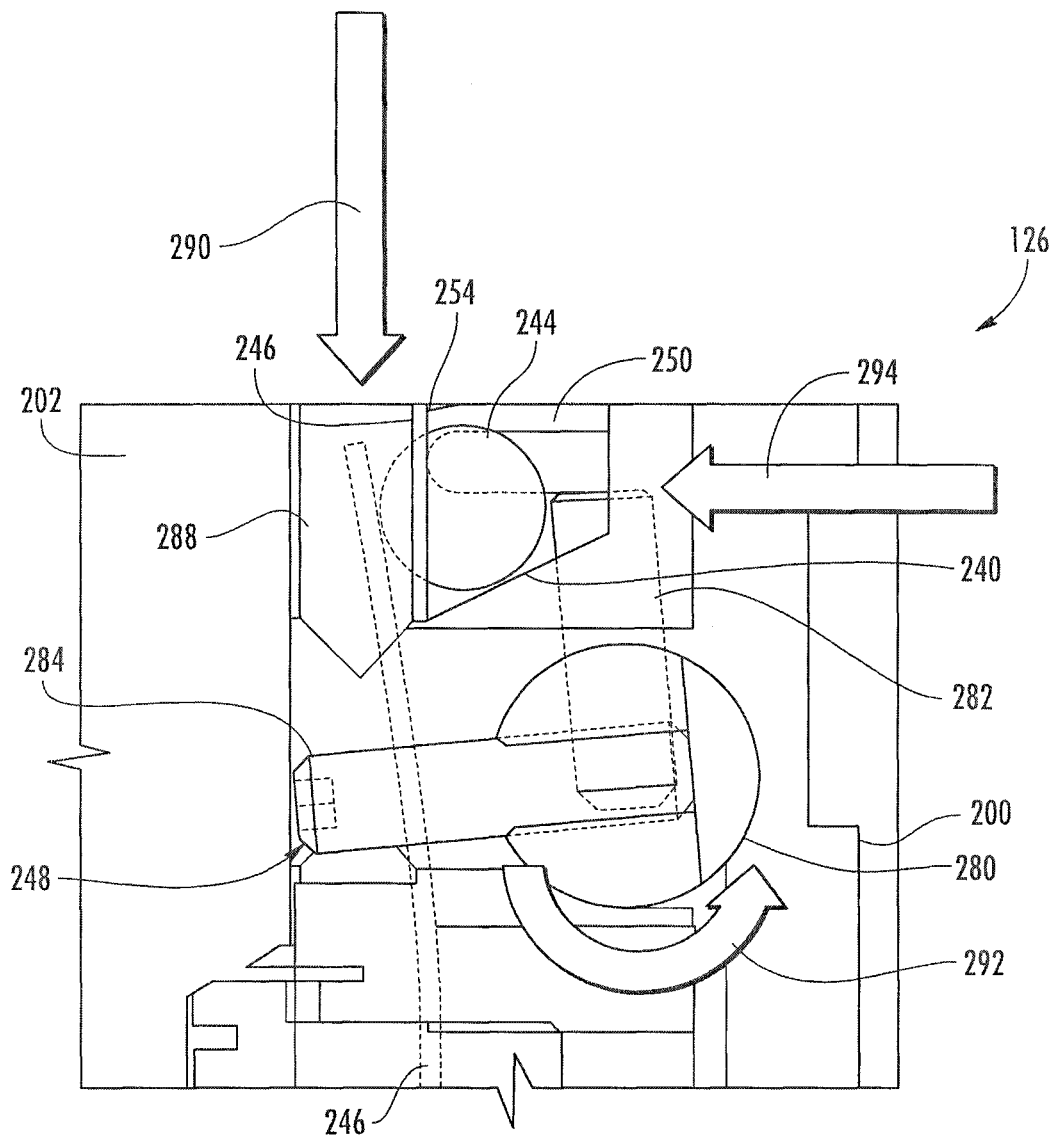
FIG. 13 is a sectional view of the substrate holder of FIG. 3 illustrating actuation of the release according to an example embodiment.

As shown by FIG. 7, release 248 comprises elongate rotatable bar or rod 280, pushers 282 and a lever 284 (shown in FIGS. 11-13). Rod 280 comprises an elongated member rotatably supported along base 200 proximate to each of wedging members 244. Pushers 282 comprise projections extending from rod 280 into contact or into close proximity to wedging members 244 as shown in FIG. 12. In one embodiment, pushers 282 comprise set screws secured to rod 280. In other embodiments, pushers 282 may have other configurations.

Lever 284 comprises an elongated extension coupled to rod 280 such that movement of lever 284 rotates rod 280 to move each of the pushers 282 against wedging member 244 to move wedging member 244 against bias 246 and towards the wider gap 254 (shown in FIG. 8) to release the wedging of wedging member 244. As shown by FIG. 12, lever 284 is eccentrically coupled to rod 280 and extends from rod 280 across a slot 288. Slot 288 permits a person to apply force to a side of lever 284 to move lever 284. For example, slot 288 permits a person to insert an Allen key therethrough to apply force to lever 284.

FIG. 13 illustrates operation of release 248. As shown by FIG. 13, force is manually applied to an end of lever 284 through slot 288 as indicated by arrow 290. As indicated by arrow 292, this force results in rotation of rod 280. As indicated by arrow 294, rotation of rod 280 results in each of pushers 282 being moved against each of wedging members 244 to move wedging members 244 towards the larger gap 254 against the bias force of bias 246 to release the wedging of each of wedging members 244. As a result, leading edge 232 (shown in FIG. 9) may be more easily withdrawn from passage 250.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An apparatus comprising:
    a substrate support comprising:
    a drum rotatable about an axis;
    a first surface carried by the drum;
    a second surface carried by the drum opposite and oblique to the first surface;
    a wedging member movably supported and sandwiched between the first surface and the second surface and resiliently biased in a wedging direction by a biasing member in contact with the wedging member, wherein the wedging member rotates about its own axis; and
    a release mechanism configured to move the wedging member away from the wedging direction, the release mechanism comprising:
    a rotatable rod;
    a pusher extending from the rod into contact with the wedging member; and
    a lever coupled to the rod such that movement of the lever rotates the rod to move the pusher against the wedging member.

2. The apparatus of claim 1, wherein the wedging member comprises a roller.

3. The apparatus of claim 1 comprising a plurality of axially spaced wedging members, including the wedging member, sandwiched between the first surface and the second surface and resiliently biased in the wedging direction.

4. The apparatus of claim 1 further comprising a spring resiliently biasing the wedging member in the wedging direction.

5. The apparatus of claim 1 further comprising a third surface extending radially opposite to the wedging member and facing away from the first surface and the second surface, wherein the wedging member and the first surface are configured to receive a first edge of a substrate therebetween and wherein the third surface is configured to support a second edge of the substrate.

6. The apparatus of claim 1 further comprising a gripper carried by the drum and circumferentially spaced from the wedging member.

7. The apparatus of claim 1 further comprising:
    a first sheet encircling at least a portion of the drum and having a portion captured between the wedging member and the first surface, the sheet including a plurality of spaced apertures;
    a plurality of grippers projecting through the plurality of apertures; and
    a second sheet at least partially encircling the drum over the first sheet, the second sheet being gripped by the plurality of grippers.

8. The apparatus of claim 1 further comprising an orientation projection configured to be received by a notch along an edge of a substrate when the edge of the substrate is inserted between the first surface and the wedging member.

9. The apparatus of claim 8, wherein the substrate comprises:
    a first sheet having a leading edge and a trailing edge;
    a plurality of spaced apertures configured to allow grippers to grip a second sheet over the first sheet;
    an imperforate band extending from the spaced apertures to the leading edge;
    a notch extending into the leading edge; and
    an access hole proximate the trailing edge.

10. The apparatus of claim 9, wherein the substrate further comprises an adhesive coating proximate to the trailing edge.

11. The apparatus of claim 1 further comprising an image forming mechanism configured to form an image on a substrate held by the support.

12. The apparatus of claim 11, wherein the image forming mechanism comprises:
    a first drum having a photoconductive surface;
    a charger configured to electrostatically charge the photoconductive surface of the first drum;
    an imager configured to selectively electrostatically charge the photoconductive surface such that the image is formed;
    an ink developer configured to apply a printing material to the photoconductive surface based on the electrostatic charge on the photoconductive surface and to develop the image on the photoconductive surface;
    an intermediate image transfer member configured to transfer the printing material on the photoconductive surface of the first drum to the substrate carried by a second drum; and
    a cleaning station configured to remove residual printing material from the photoconductive surface.

13. The apparatus of claim 12 further comprising a substrate remover configured to lift and remove the substrate from the second drum.

* * * * *

UNITED STATES PATENT AND TRADEMARK OFFICE
CERTIFICATE OF CORRECTION

PATENT NO. : 9,624,040 B2  
APPLICATION NO. : 13/700805  
DATED : April 18, 2017  
INVENTOR(S) : Alexander Feygelman et al.

Page 1 of 1

It is certified that error appears in the above-identified patent and that said Letters Patent is hereby corrected as shown below:

On the Title Page

In item (75), Inventor, in Column 1, Line 1, delete "Petach-Tiqwa" and insert -- Petah-Tikva --, therefor.

In item (75), Inventor, in Column 1, Line 2, delete "Gan Yavna" and insert -- Gan Yavne --, therefor.

Signed and Sealed this  
First Day of August, 2017

Joseph Matal  
*Performing the Functions and Duties of the*  
*Under Secretary of Commerce for Intellectual Property and*  
*Director of the United States Patent and Trademark Office*